US011329855B2

(12) United States Patent
Dong (10) Patent No.: US 11,329,855 B2
(45) Date of Patent: May 10, 2022

(54) ORTHOGONAL FREQUENCY DIVISION MULTIPLEXING DEMODULATOR, DEMODULATION METHOD, AND RECEIVER (71) Applicant: SANECHIPS TECHNOLOGY CO., LTD., Guangdong (CN)

(72) Inventor: Jingjing Dong, Guangdong (CN)

(73) Assignee: SANECHIPS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/288,634

(22) PCT Filed: Sep. 6, 2019

(86) PCT No.: PCT/CN2019/104789
§ 371 (c)(1),
(2) Date: Apr. 26, 2021

(87) PCT Pub. No.: WO2020/082915
PCT Pub. Date: Apr. 30, 2020

(65) Prior Publication Data
US 2021/0392027 A1 Dec. 16, 2021

(30) Foreign Application Priority Data
Oct. 25, 2018 (CN) .......................... 201811251808.1

(51) Int. Cl.
H04L 27/26 (2006.01)
H04L 27/38 (2006.01)

(52) U.S. Cl.
CPC ...... H04L 27/2649 (2013.01); H04L 27/3863 (2013.01)

(58) Field of Classification Search
CPC . H04L 5/023; H04L 27/3863; H04L 27/2647; H04L 27/2649; H04L 27/38
See application file for complete search history.

(56) References Cited

U.S. PATENT DOCUMENTS

2007/0237245 A1* 10/2007 Finkelstein ....... H04L 25/03159
375/260
2018/0254754 A1 9/2018 Carvalho

FOREIGN PATENT DOCUMENTS

CN 106953639 A 7/2017
WO 2009104758 A1 8/2009

OTHER PUBLICATIONS

China Patent Office, First Office Action dated Feb. 22, 2022 for application No. CN201811251808.1.

* cited by examiner

Primary Examiner — Rahel Guarino
(74) Attorney, Agent, or Firm — Li & Cai Intellectual Property (USA) Office (57) ABSTRACT There are provided an orthogonal frequency division multiplexing (OFDM) demodulator, a demodulation method and a receiver. The OFDM demodulator includes a phase analog-to-digital converter and a determiner, wherein the phase analog-to-digital converter is configured to acquire an OFDM analog signal, extract and quantize phase information of a modulated signal on each subcarrier in the OFDM analog signal, and output a phase quantified value corresponding to the phase information of the each subcarrier; and the determiner is configured to perform determination according to the phase quantified value, to obtain modulation information corresponding to the each subcarrier.

17 Claims, 5 Drawing Sheets

ORTHOGONAL FREQUENCY DIVISION MULTIPLEXING DEMODULATOR, DEMODULATION METHOD, AND RECEIVER

TECHNICAL FIELD

Embodiments of the present disclosure relate to, but are not limited to, wireless communication technologies, and more particularly relates to an orthogonal frequency division multiplexing (OFDM) demodulator, a demodulation method, and a receiver.

BACKGROUND

To meet the increasing demand for information, the mobile communication technology has been rapidly developed in recent years. The 2nd Generation (2G) era is dominated by voice services, while high-speed data services continue to grow in the 4th Generation (4G) era. The 5th Generation (5G) era involves more extensive applications of mobile communication. One of the most important features in the development of mobile communication is the continuous increase of communication rate, which has been accelerated from 270 kb/s of Global System for Mobile Communication (GSM), to that more than 1 Gb/s of Long Term Evolution (LTE) Cat. 18, and even more than 10 Gb/s in mm wave communication. The rate increase provides convenience to applications, as well as challenges to the design of mobile communication systems.

In a communication system, a core part determining the communication rate is the demodulator of the wireless receiver, and most 4G or 5G demodulators support Orthogonal Frequency Division Multiplexing (OFDM) demodulation. In order to meet the requirement of high speed, the design of the OFDM demodulator becomes more and more complex, with ever increasing power consumption and cost.

SUMMARY

The following is a summary of the subject matter described in detail in the disclosure. This summary is not intended to limit the scope of the claims.

Embodiments of the present disclosure provide an orthogonal frequency division multiplexing (OFDM) demodulator, a demodulation method and a receiver. The OFDM demodulator provided in an embodiment of the present disclosure includes: a phase analog-to-digital converter, a determiner and a parallel-to-serial converter. The phase analog-to-digital converter is configured to acquire an OFDM analog signal, extract and quantize phase information of a modulated signal on each subcarrier in the OFDM analog signal, and output a phase quantified value corresponding to the phase information of the each subcarrier; and the determiner is configured to perform determination according to the phase quantified value, to obtain modulation information corresponding to the each subcarrier.

The OFDM demodulation method provided in an embodiment of the present disclosure includes: acquiring an OFDM analog signal, extracting and quantizing phase information of a modulated signal on each subcarrier in the OFDM analog signal, and outputting a phase quantified value corresponding to the phase information of the each subcarrier; and performing determination according to the phase quantified value, to obtain modulation information corresponding to the each subcarrier.

The receiver provided in an embodiment of the present disclosure includes an analog intermediate frequency (IF) circuit, the OFDM demodulator according to the embodiment of the present application, and a digital baseband circuit. The analog IF circuit is configured to amplify and filter an IF signal and output an IF OFDM analog signal to the OFDM demodulator, and the digital baseband circuit is configured to receive demodulated output from the OFDM demodulator and perform baseband operation and processing in a digital domain.

Other aspects will become apparent upon reading and understanding the drawings and detailed description.

DETAILED DESCRIPTION

Technical solutions of the present disclosure will be illustrated in further detail below with reference to the accompanying drawings and detailed embodiments. Unless defined otherwise, all technical and scientific terms used herein have the same meaning as commonly understood by those skilled in the art to which the present disclosure belongs. The terminology used in the description of the present disclosure herein is for the purpose of describing particular embodiments only and is not intended to be limiting of the present disclosure. As used herein, the term "and/or" includes any and all combinations of one or more of the associated listed items.

In the following description, reference is made to the expression "some embodiments", which describes a subset of all possible embodiments, but it should be understood that "some embodiments" may be the same subset or a different subset of all possible embodiments.

Before further detailed description of the present disclosure, terms and expressions referred to in the embodiments of the present disclosure are described, and the terms and expressions referred to in the embodiments of the present disclosure are applicable to the following explanations.

1) Long Term Evolution (LTE): long term evolution of the technical standard Universal Mobile Telecommunications System (UMTS) established by the 3rd Generation Partnership Project (3GPP) organization.

2) Orthogonal Frequency Division Multiplexing (OFDM): a modulation multiplexing technology that divides a system bandwidth into a plurality of mutually orthogonal subcarriers on which data is transmitted in parallel; it is one of the key technologies introduced in LTE. The main idea of OFDM is to divide a signal into several orthogonal sub-signals, convert a high-speed data signal into parallel low-speed sub-data streams, and modulate them onto sub-channels respectively for transmission. The orthogonal sub-signals may be separated at the receiving end to reduce mutual interference (ISI) between the sub-channels.

3) Subcarrier: in the OFDM technology, each symbol occupies a bandwidth of 3.84M and corresponds to an orthogonal subcarrier; mutual orthogonality between the carriers is used to combat interference. The subcarriers are typically spaced from each other by 15 kHz. In the case of Normal Cyclic Prefix (Normal CP), there are 7 symbols per subcarrier per time slot; and in the case of Extend CP, there are 6 symbols per subcarrier per time slot.

4) Modulation: a process of processing information from a signal source to add the information to a carrier to convert the information into a form suitable for channel transmission, that is, a technology of changing a carrier with a signal. Modulation is achieved by changing the amplitude, phase or frequency of a high frequency carrier, i.e. a carrier signal of a message, so that it varies with amplitude of a baseband signal.

5) Baseband signal: it means that information from a signal source (also referred to as an information source) contains a direct current component and a frequency component of a lower frequency. The baseband signal is commonly referred to as modulation signal.

6) Modulated signal: a baseband signal is often not available as a transmission signal, and needs to be converted into a signal with a very high frequency relative to the baseband frequency, called modulated signal, to be suitable for channel transmission.

7) Demodulation: a process of recovering the original modulation signal from the modulated signal. Demodulation is an inverse process of modulation. The demodulation method corresponds to the classification of modulation, which mainly includes frequency shift keying modulation, phase shift keying modulation and the like.

8) Frequency Shift Keying (FSK) modulation: a modulation scheme in which changes in a carrier frequency is controlled with a digital signal.

9) Phase Shift Keying (PSK) modulation: a modulation technology in which a carrier phase is used for representing information of an input signal.

It is found in research that since the current OFDM demodulator is implemented in the digital domain, a high-speed and high-precision voltage analog-to-digital converter (ADC) is required to convert an analog voltage signal into a digital signal in advance. According to signal theories, the ADC needs to have a rate exceeding the Nyquist sampling rate to retain information of the signal, which puts high demands on the rate of the ADC. Since envelope of the OFDM signal in the time domain is not constant and there is a relatively large peak-to-average power ratio (PAPR), it is required that the ADC should have more quantization bits to provide a sufficient dynamic range and signal-to-noise ratio. Therefore, the OFDM demodulator poses a great challenge to ADC design, making it more than more complex with ever increasing power consumption and cost. Many efforts have been made in the art to hopefully alleviate the above difficulties of the OFDM demodulator and the ADC in complexity, power consumption and cost, including optimizing an OFDM demodulation algorithm in the digital domain, adopting segmentation, low power design and time interleaving techniques in the ADC design, and the like. However, these efforts, all based on the structure of a voltage ADC and a digital OFDM demodulator, are merely small optimizations in module performance within a given framework, and cannot fundamentally overcome the above challenges.

Moreover, it is further found in research that, to substantially reduce the design cost and difficulties of the OFDM demodulator and the ADC, a new demodulator structure may be provided, which starts from the original source of signal modulation to re-divide the digital and the analog, and recovers useful information more directly and efficiently, thereby avoiding the conventional voltage ADC circuit, and improving the efficiency of the demodulator.

Based on above, the embodiments of the present application provide a new demodulator which starts from the original source of signal modulation to re-divide the digital and the analog, and directly obtains and quantizes phase information of each subcarrier in the OFDM analog signal, thereby avoiding the conventional voltage ADC circuit, fundamentally avoiding the traditional design challenge caused by obtaining the phase through the voltage calculation, and reducing the complexity, the power consumption and the cost.

Figure 1:
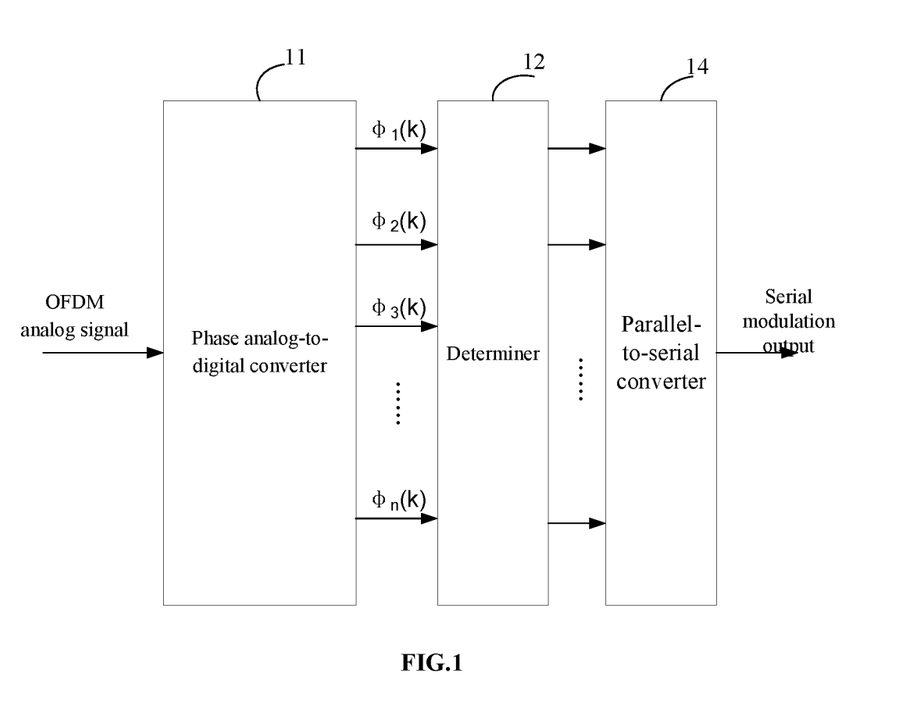
FIG. 1 is a schematic structural diagram of an OFDM demodulator according to an embodiment of the present disclosure.

As shown in FIG. 1, in an embodiment of the present disclosure, there is provided an OFDM demodulator 10 (FIG. 10) including a phase analog-to-digital converter 11 and a determiner 12. The phase analog-to-digital converter 11 is configured to acquire an OFDM analog signal, extract and quantize phase information of a modulated signal on each subcarrier in the OFDM analog signal, and output a phase quantified value corresponding to the phase information of the each subcarrier. The determiner 12 is configured to perform determination according to the phase quantified value, to obtain modulation information corresponding to the each subcarrier.

In the OFDM demodulator 10 provided in the embodiment of the present application, by acquiring an OFDM analog signal, extracting and quantizing phase information of a modulated signal on each subcarrier in the OFDM analog signal, and outputting a phase quantified value corresponding to the phase information of the each subcarrier; and then performing determination according to the phase quantified value, to obtain modulation information corresponding to the each subcarrier, it is achieved that the phase information on each subcarrier is directly obtained and quantified, and thus the modulation information is obtained. Since fluctuations in the amplitude of an input radio frequency (RF) signal in a certain range will not obviously influence the phase information, the requirement for gain control of a receiver using the demodulator is reduced, which facilitates reduction of the design cost and complexity of the receiver, avoids the need of obtaining the phase through voltage calculation by adopting a conventional voltage ADC, and reduces the design difficulty of the wireless receiver as well as the cost and the power consumption.

OFDM demodulation is achieved by the phase analog-to-digital converter 11 and the determiner 12 described above, resulting in parallel modulation information. The parallel modulation information may be used after parallel-to-serial conversion by a post circuit. In an exemplary embodiment, the parallel-to-serial conversion may be performed by the OFDM demodulator. In this case, the OFDM demodulator 10 may further include a parallel-to-serial converter 14. The parallel-to-serial converter 14 is configured to convert the modulation information corresponding to the each subcarrier into serial output.

Acquiring the OFDM analog signal by the phase analog-to-digital converter 11 as described above refers to acquiring an IF OFDM analog signal. OFDM is a multi-carrier modulation scheme that equally divides a frequency band by a plurality of carriers. Intermediate Frequency (IF) is defined relative to baseband signals (I/Q signals) and radio frequency (RF) signals, and IF may have one or more stages, and is a bridge between the baseband and the radio frequency. In a receiver system, an RF signal entering an antenna is converted into an IF signal first and then into an I/Q signal, wherein the RF signal is a high frequency signal which is converted into an IF signal after frequency conversion processing, so as to ensure that an input signal ratio of the OFDM demodulator 10 is within a reasonable range.

The phase analog-to-digital converter 11 is a mixed signal circuit, and inputs an IF OFDM analog signal. The phase analog-to-digital converter 11 is configured to extract and quantize phase information of a modulated signal on each subcarrier in the IF OFDM analog signal, and output the quantified discrete value representing the corresponding phase corresponding to the phase information. The OFDM analog signal Y(t) may be expressed as:

$$Y(t)=X_1(t)+X_2(t)+X_3(t)\ldots X_n(t),$$

where $X_n(t)$ is a signal on the $n^{th}$ subcarrier, and n is a positive integer, such as n=1, 2, 3 . . . ;

$$X_1(t)=A_1 \cos[\omega_1 t+\varphi_1(t)]+C_1$$

$$X_2(t)=A_2 \cos[\omega_2 t+\varphi_2(t)]+C_2$$

$$X_n(t)=A_n \cos[(\omega_n t+\varphi_n(t)]+C_n$$

where $A_n$, $\omega_n$ and $C_n$ are respectively the amplitude, the carrier angular frequency and the direct current component of the signal on the $n^{th}$ subcarrier; and $\varphi_n(t)$ is a phase at which the signal on the $n^{th}$ subcarrier is modulated, i.e., phase information of the modulated signal on the $n^{th}$ subcarrier. In PSK and FSK modulations, the information is only present in $\varphi_n(t)$, while $A_n$, $\omega_n$ and $C_n$ do not load the information, and serve as only carriers and accessories.

Extracting and quantizing phase information of the modulated signal on each subcarrier in the OFDM analog signal by the phase analog-to-digital converter 11 means extracting the phase information $\varphi_n(t)$, which is an analog signal, on each subcarrier in the OFDM analog signal Y(t), and quantizes the phase information to obtain the corresponding discrete value $\varphi_n(k)$, i.e., the phase quantified value corresponding to the phase information on each subcarrier.

The determiner 12 is configured to obtain the phase quantified values $\varphi_1(k)$ to $\varphi_n(k)$ output by the phase analog-to-digital converter 11, and perform determination according to the phase quantified values, to obtain modulation information corresponding to the each subcarrier. The determination may be made according to a rule based on polarity, where if a phase polarity corresponding to the phase quantified value is positive, the determination is 1, and if the phase polarity corresponding to the phase quantified value is negative, the determination is 0; or, the determination may be made according to a rule based on comparison of the phase quantified value and a preset threshold, where if the phase quantified value is greater than the preset threshold, the determination is 1, and if the phase quantified value is less than the preset threshold, the determination is 0; or, the determination may be made according to a rule based on changes in the phase quantified value in adjacent quantization periods on each subcarrier, where if changes in the phase quantified value satisfies a preset condition, the determination is 1, and if the preset condition is not satisfied, the determination is 0. The determiner 12 demodulates the phase information corresponding to the modulated signal into a corresponding digital signal, from which the original modulation signal can be restored (e.g., through parallel-to-serial conversion).

In some embodiments, the determiner 12 is configured to perform determination according to the phase quantified value based on a preset modulation scheme, to obtain modulation information corresponding to the each subcarrier. For example, for PSK modulation, determination is performed according to the phase quantified value corresponding to the phase information of each subcarrier to obtain the modulation information; and for FSK modulation, determination is performed according to changes in the phase of each subcarrier to obtain the modulation information.

In some embodiments, the parallel-to-serial converter 14 combines digital signals corresponding to each subcarrier demodulated by the determiner 12 into a serial output.

Figure 2:
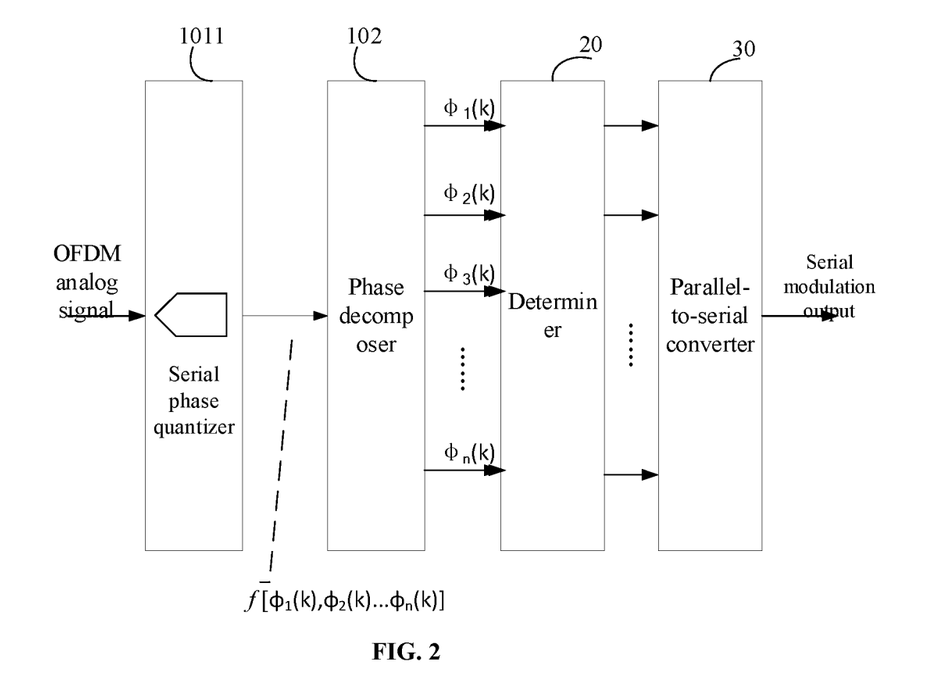
FIG. 2 is a schematic structural diagram of an OFDM demodulator according to another embodiment of the present disclosure.

In some embodiments, referring to FIG. 2, the phase analog-to-digital converter 11 includes a phase quantizer and a phase decomposer 102 connected to the phase quantizer. The phase quantizer is configured to quantize phase information in the OFDM analog signal, and the phase decomposer 102 is configured to decompose the phase quantified value on each subcarrier in the OFDM analog signal according to multiple sets of quantified OFDM analog signals. Here, the phase quantizer may be a serial phase quantizer 1011. The serial phase quantizer 1011 refers to a phase quantizer that includes only one phase analog-to-digital conversion branch, through which phase information of the OFDM analog signal is quantized at a higher speed. The serial phase quantizer 1011 quantizes the phase information of the IF OFDM analog signal according to a preset quantization period T, to obtain a function of the phase on each subcarrier, i.e., $f[\varphi_1(k), \varphi_2(k), \varphi_3(k), \ldots \varphi_n(k)]$. Each quantization period may result in a set of quantified functions, and each set of quantified functions includes phase quantified values on n subcarriers. The phase decomposer 102 decomposes the phase quantified values $\varphi_1(k)$, $\varphi_2(k)$, $\varphi_3(k), \ldots \varphi_n(k)$ on each subcarrier by performing an operation on multiple sets of quantified OFDM analog signals $f[\varphi_1(k), \varphi_2(k), \varphi_3(k), \ldots \varphi_n(k)]$ corresponding to different quantization periods, respectively.

The multiple sets of quantified OFDM analog signals $f[\varphi_1(k), \varphi_2(k), \varphi_3(k), \ldots \varphi_n(k)]$ corresponding to different quantization periods may be expressed as the following equations (1-1) to (1-j):

$$f[\varphi_1(k),\varphi_2(k),\varphi_3(k),\ldots \varphi_n(k)]|_{t=T}=f[\varphi_1(T),\varphi_2(T),\varphi_3(T),\ldots \varphi_n(T)] \quad (1\text{-}1)$$

$$f[\varphi_1(k),\varphi_2(k),\varphi_3(k),\ldots \varphi_n(k)]|_{t=2T}=f[\varphi_1(T),\varphi_2(T),\varphi_3(T),\ldots \varphi_n(2T)] \quad (1\text{-}2)$$

$$f[\varphi_1(k),\varphi_2(k),\varphi_3(k),\ldots \varphi_n(k)]|_{t=3T}=f[\varphi_1(T),\varphi_2(T),\varphi_3(T),\ldots \varphi_n(3T)] \quad (1\text{-}3)$$

$$f[\varphi_1(k),\varphi_2(k),\varphi_3(k),\ldots\varphi_n(k)]|_{t=jT}=f[\varphi_1(T),\varphi_2(T),\varphi_3(T),\ldots\varphi_n(jT)] \quad (1\text{-}j)$$

where T represents the quantization period. Equation (1-1) represents the quantified function obtained in the 1st quantization period, equation (1-2) represents the quantified function obtained in the 2nd quantization period, equation (1-3) represents the quantified function obtained in the 3rd quantization period, and equation (1-j) represents the quantified function obtained in the $j^{th}$ quantization period. Here, j may be greater than n, equal to n, or less than n.

By quantizing the phase information of the OFDM analog signals corresponding to the j quantization periods respectively, j sets of functions, $f[\varphi_1(T), \varphi_2(T), \varphi_3(T), \ldots \varphi_n(T)]$ to $f[\varphi_1(jT), \varphi_2(jT), \varphi_3(jT), \ldots \varphi_n(jT)]$ are obtained. Each set of functions, i.e., each set of quantified output, includes phase information on all subcarriers, and by performing an operation on the j sets of functions, n variables $\varphi_1(k)$, $\varphi_2(k)$, $\varphi_3(k), \ldots \varphi_n(k)$ are obtained.

Figure 3:
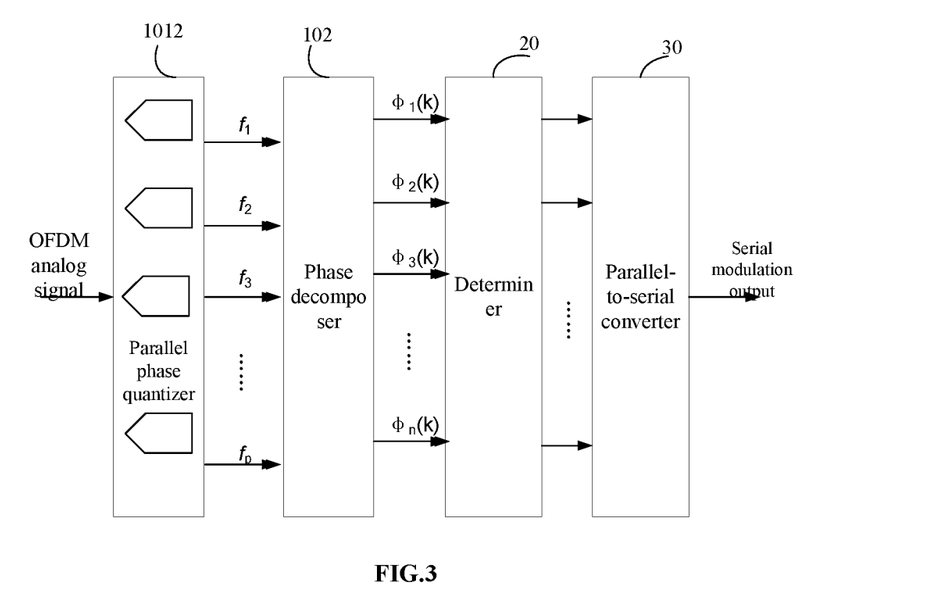
FIG. 3 is a schematic structural diagram of an OFDM demodulator according to further another embodiment of the present disclosure.

In some embodiments, referring to FIG. 3, the phase quantizer may also be a parallel phase quantizer 1012. The parallel phase quantizer 1012 refers to a phase quantizer including multiple parallel phase analog-to-digital conversion branches, each of which is configured to quantize phase information in the OFDM analog signal to obtain a function containing the phase quantified value corresponding to the phase information of each subcarrier. By quantizing the phase information of the OFDM analog signal in a low-speed parallel manner through the multiple phase analog-to-digital conversion branches, the parallel phase quantizer 1012 can increase the phase quantization speed, and thus is more suitable for a receiver with a higher speed requirement. Taking p phase analog-to-digital conversion branches in the parallel phase quantizer 1012 as an example, the parallel phase quantizer 1012 quantizes phase information in the OFDM analog signal in a parallel manner to obtain a function containing a phase quantified value corresponding to phase information of each subcarrier: $f_p[\varphi_1(k), \varphi_2(k), \varphi_3(k), \ldots \varphi_n(k)]$, which, for example, as shown by equations (2-1) to (2-p):

$$f_1[\varphi_1(k),\varphi_2(k),\varphi_3(k),\ldots\varphi_n(k)] \quad (2\text{-}1)$$

$$f_2[\varphi_1(k),\varphi_2(k),\varphi_3(k),\ldots\varphi_n(k)] \quad (2\text{-}2)$$

$$f_3[\varphi_1(k),\varphi_2(k),\varphi_3(k),\ldots\varphi_n(k)] \quad (2\text{-}3)$$

. . . .

$$f_p[\varphi_1(k),\varphi_2(k),\varphi_3(k),\ldots\varphi_n(k)] \quad (2\text{-}p)$$

where p may be greater than n, equal to n, or less than n. The phase decomposer 102 performs an operation on the functions $f_1[\varphi_1(k), \varphi_2(k), \varphi_3(k), \ldots \varphi_n(k)]$ to $f_p[\varphi(k), \varphi_2(k), \varphi_3(k), \ldots \varphi_n(k)]$ obtained from the above p phase analog-to-digital conversion branches, including phase quantified values corresponding to the phase information on each subcarrier, and obtains n variables $\varphi_1(k)$, $\varphi_2(k)$, $\varphi_3(k), \ldots \varphi_n(k)$, i.e., phase quantified values on each subcarrier.

Figure 4:
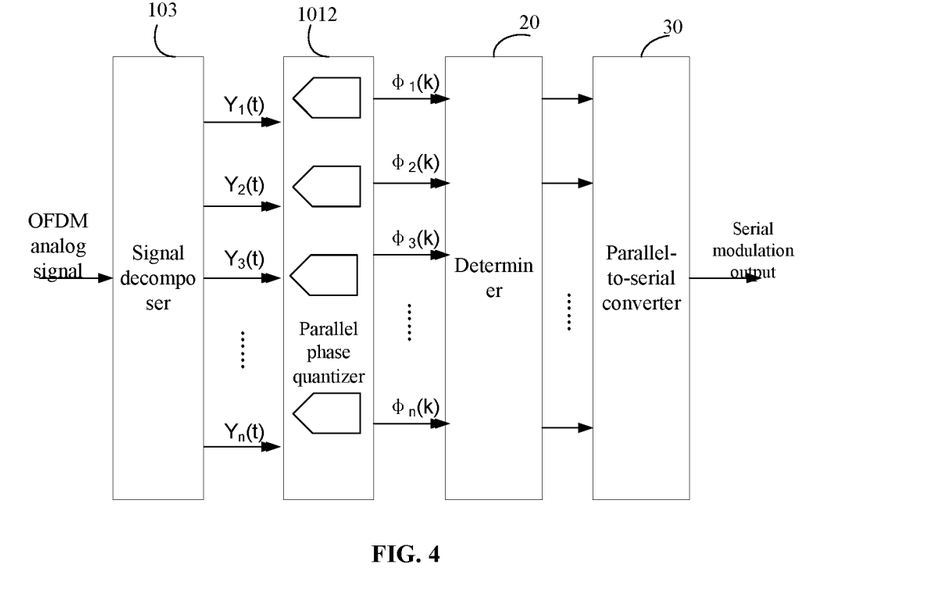
FIG. 4 is a schematic structural diagram of an OFDM demodulator according to still another embodiment of the present disclosure.

In some embodiments, as shown in FIG. 4, the phase analog-to-digital converter 11 includes a signal decomposer 103 and a phase quantizer connected to the signal decomposer 103. The signal decomposer 103 is configured to decompose the OFDM analog signal into multiple parallel OFDM analog signals, and the phase quantizer is configured to quantize phase information in the decomposed multiple parallel OFDM analog signals to obtain the phase quantified value corresponding to the phase information of each subcarrier. Here, after acquiring the OFDM analog signal and decomposing the OFDM analog signal into multiple parallel branches of OFDM analog signals by the signal decomposer 103, the phase analog-to-digital converter 11 further quantizes phase information in the OFDM analog signals by the phase quantizer. Each branch of OFDM analog signals may load phase information of a modulated signal on a single subcarrier or a preset number of subcarriers. Taking n branches of subcarriers and each branch of OFDM analog signals loading the phase information of the modulated signal on a corresponding single subcarrier as an example, the signal decomposer 103 decomposes the OFDM analog signal Y(t) into n parallel branches of OFDM analog signals $Y_n(t)$, which are expressed as follows:

$$Y_1(t)=f_1[\varphi_1(t)] \quad (3\text{-}1)$$

$$Y_2(t)=f_2[\varphi_2(t)] \quad (3\text{-}2)$$

. . . .

$$Y_n(t)=f_n[\varphi_n(t)] \quad (3\text{-}n).$$

Here, the phase quantizer is a parallel phase quantizer 1012. The parallel phase quantizer 1012 includes n parallel phase analog-to-digital conversion branches, each of which quantizes the phase information of the decomposed OFDM analog signals $Y_n(t)$ to obtain the phase quantified values $\varphi_1(k)$, $\varphi_2(k)$, $\varphi_3(k)$, $\varphi_n(k)$ of the phase information of the subcarriers loaded on the decomposed OFDM analog signals $Y_n(t)$.

Figure 5:
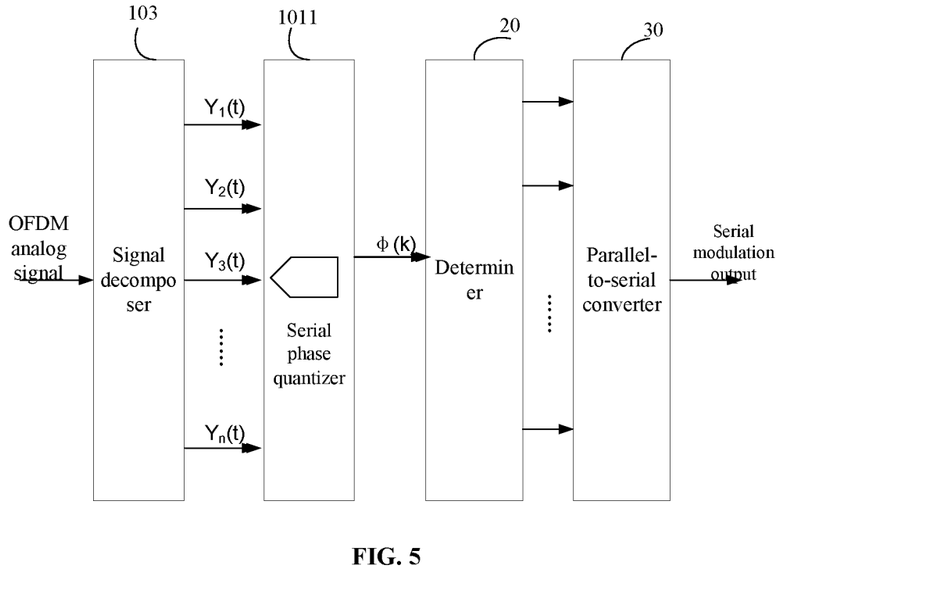
FIG. 5 is a schematic structural diagram of an OFDM demodulator according to yet another embodiment of the present disclosure.

In some embodiments, as shown in FIG. 5, the phase analog-to-digital converter 11 includes a signal decomposer 103 and a phase quantizer connected to the signal decomposer 103. The signal decomposer 103 is configured to decompose the OFDM analog signal into multiple parallel OFDM analog signals, and the phase quantizer is configured to quantize phase information in the decomposed multiple parallel OFDM analog signals to obtain the phase quantified value corresponding to the phase information of each subcarrier. The phase quantizer may also be a serial phase quantizer 1011. The serial phase quantizer 1011 includes only one phase analog-to-digital conversion branch through which all phase information in the decomposed OFDM analog signals $Y_n(t)$ is quantized to obtain the phase quantified values $\varphi_1(k)$, $\varphi_2(k)$, $\varphi_3(k), \ldots \varphi_n(k)$ corresponding to the phase information of the subcarriers loaded on the decomposed OFDM analog signals $Y_n(t)$. The manner of decomposing the OFDM analog signal Y(t) into n parallel branches of OFDM analog signals $Y_n(t)$ by the signal decomposer 103 may be the same as that shown in the foregoing embodiments, which, for example, may be expressed as equations 3-1 to 3-n, and is not repeated here.

Figure 6:
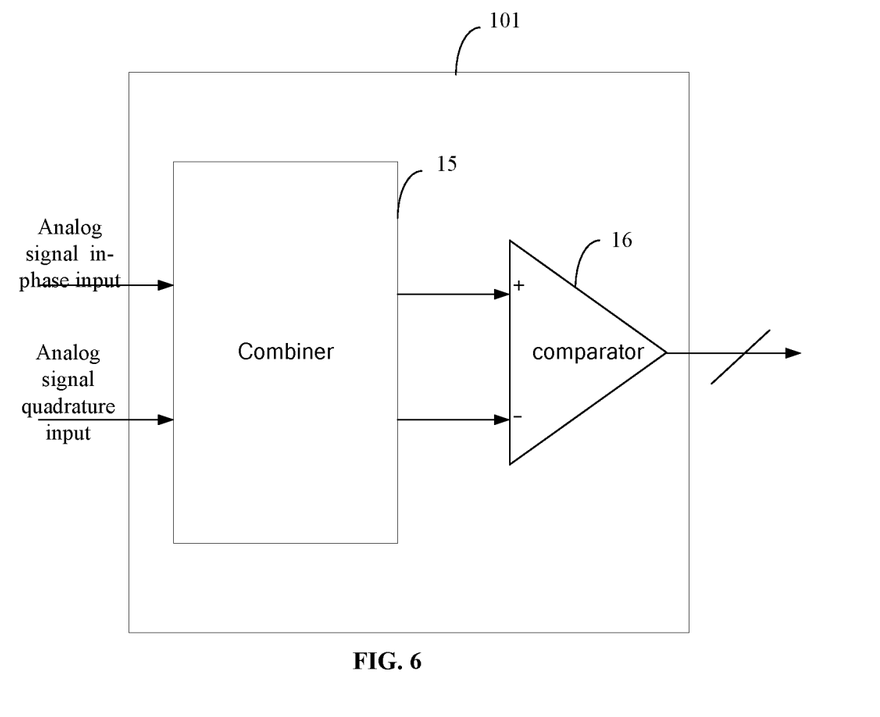
FIG. 6 is a schematic structural diagram of a phase quantizer according to an embodiment of the present disclosure.
Figure 7:
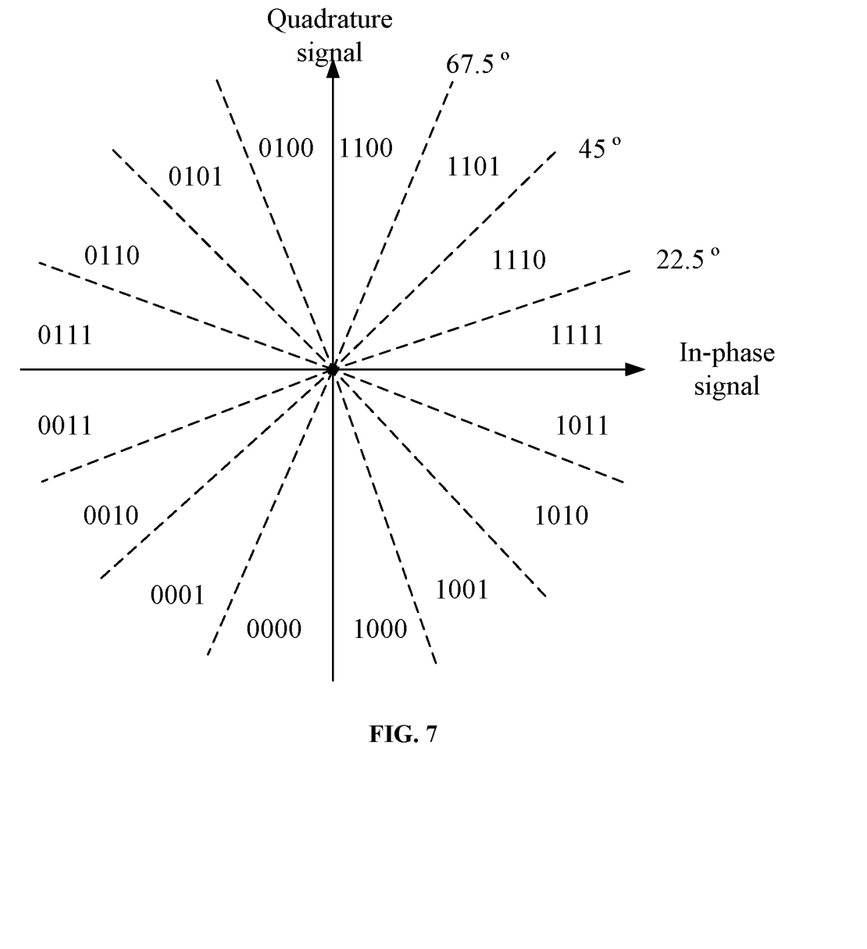
FIG. 7 is a schematic diagram showing phase domain segmentation according to an embodiment of the present disclosure.

In some embodiments, referring to FIG. 6, the phase quantizer 101 may include a combiner 15 and a comparator 16. The combiner 15 is configured to amplify or reduce an in-phase branch input signal (hereinafter "in-phase branch signal") and a quadrature branch input signal (hereinafter "quadrature branch signal") in the OFDM analog signal at different weights, respectively, and the comparator 16 is configured to compare the amplified/reduced in-phase signals and quadrature signals to obtain quantified digital information. Here, the amplification/reduction operation performed by the combiner 15 may be equivalent to dividing a complex plane into different sectors, and the comparison operation performed by the comparator 16 may be equivalent to positioning a phase of the input signal into one of the sectors of the complex plane. The combiner 15 generates different amplification/reduction ratios according to a previous quantization result from the comparator at different moments, and accordingly, the comparator 16 generates quantified digital information output at the next moment, until the phase quantization with a designated precision is completed. Referring to FIG. 7, taking 4 as an exemplary quantization precision, a phase domain of a complex plane is divided into 16 sectors, the phase is divided into 16 approximately equally divided sectors, each of which has a boundary of m*22.5 degrees, where m=1 to 16. Each sector corresponds to a unique binary code. The binary code is represented by $B_3 B_2 B_1 B_0$ where $B_3$ represents a polarity of an in-phase branch signal; $B_2$ represents a polarity of a quadrature branch signal; $B_1$ indicates whether an absolute value of the in-phase branch signal is greater than an absolute value of the quadrature branch signal. For example, when $B_1$ is 1, it indicates that the absolute value of the in-phase branch signal is greater than the absolute value of the quadrature branch signal, and when $B_1$ is 0, it indicates that the absolute value of the in-phase branch signal is not greater than (or less than) the absolute value of the quadrature branch signal. When $B_1$ indicates that the absolute value of the in-phase branch signal is greater than the absolute value of the quadrature branch signal (e.g., is 1), $B_0$ indicates that the absolute value of the in-phase branch signal is greater than a preset multiple of the absolute value of the quadrature branch signal, and when $B_1$ indicates that the absolute value of the in-phase branch signal is less than the absolute value of the quadrature branch signal (e.g., is 0), $B_0$ indicates that the absolute value of the in-phase branch signal is less than a preset multiple of the absolute value of the quadrature branch signal. The binary code manner makes full use of the information quantity of a four-bit binary number, and thus is beneficial to saving power consumption.

Figure 8:
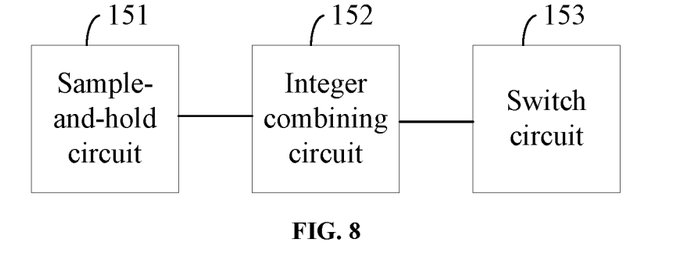
FIG. 8 is a schematic structural diagram of a combiner according to an embodiment of the present disclosure.

Referring to FIG. 8, the combiner 15 includes a sample-and-hold circuit 151, an integer combining circuit 152 and a switch circuit 153. The sample-and-hold circuit 151 is configured to sample in-phase and quadrature branch analog input signals at a designated frequency, respectively, and hold the signals in a next period for combination by a post circuit. The integer combining circuit 152 is configured to achieve integer-times of amplification/reduction of an in-phase branch signal and a quadrature branch signal. The switch circuit 153 is configured to implement amplification/reduction control and polarity switching of the in-phase branch signal and the quadrature branch signal.

Here, the in-phase and quadrature branch analog input signals are represented by $V_{1+}$ $V_{1-}$ $V_{Q+}$ $V_{Q-}$, where $V_{1+}$ represents an in-phase branch analog input signal having a positive signal polarity, $V_{1-}$ represents an in-phase branch analog input signal having a negative signal polarity, $V_{Q+}$ represents a quadrature branch analog input signal having a positive signal polarity, and $V_{Q-}$ represents a quadrature branch analog input signal having a negative signal polarity. By holding the signal in the next period, $V_{IP}$ $V_{IN}$ $V_{QP}$ $V_{QN}$ are obtained, where $V_{IP}$ represents a positive in-phase branch signal, $V_{IN}$ represents a negative in-phase branch signal, $V_{QP}$ represents a positive quadrature branch signal, and $V_{QN}$ represents a negative quadrature branch signal. The integer combining circuit 152 is configured to achieve integer-times of amplification/reduction of an in-phase branch signal and a quadrature branch signal. The amplification/reduction ratio may be determined according to the number of sectors into which the phase is divided. The integer combining circuit 152 may include a plurality of digitally controlled transconductance units to which the switch circuit 153 is connected. The switch circuit 153 is configured to control the number of the digitally controlled transconductance units respectively accessed by $V_{IP}$, $V_{IN}$, $V_{QP}$ and $V_{QN}$, as well as the polarity of the output signals, adjust the amplification/reduction multiple through the number of the accessed digitally controlled transconductance units, obtain an absolute value by controlling the polarity of the output signal, and output the signal after amplification/reduction and taking the absolute value to the comparator to obtain a corresponding quantization number. For example, through combined switching of on and off of a plurality of switches in the switch circuit 153, the in-phase branch signal is controlled to enable the digitally controlled transconductance units, while the quadrature branch signal is controlled to disable the digitally controlled transconductance units, so that a quantified number $B_3$ representing the polarity of the in-phase branch signal is obtained through the comparator after amplification/reduction; or the quadrature branch signal is controlled to enable the digitally controlled transconductance units, while the in-phase branch signal is controlled to disable the digitally controlled transconductance units, so that a quantified number $B_2$ representing the polarity of the quadrature branch signal is obtained through the comparator after amplification/reduction; or the in-phase branch signal is controlled to enable a first number of digitally controlled transconductance units, while the quadrature branch signal is controlled to enable a second number of digitally controlled transconductance units, so that a quantified number $B_1$ representing that the absolute value of the in-phase branch signal is greater than that of the quadrature branch signal is obtained through the comparator after amplification/reduction of corresponding times; or the in-phase branch signal is controlled to enable a third number of digitally controlled transconductance units, while the quadrature branch signal is controlled to enable a fourth number of digitally controlled transconductance units, so that a quantified number $B_0$ representing that the absolute value of the in-phase branch signal is greater than a multiple of the absolute value of the quadrature branch signal is obtained after amplification/reduction of corresponding times. In this manner, the phase information in the analog signal is extracted and quantified to obtain a phase quantified value with a quantization precision corresponding to the phase information.

It should be noted that, in the OFDM demodulator 10 provided in the embodiments of the present application, the structure of the phase quantizer is not limited to that in the embodiments of the present application. With the teaching of the OFDM demodulator 10 provided in the present application that acquires an OFDM analog signal by the phase analog-to-digital converter 11, extracts and quantizes phase information of a modulated signal on each subcarrier in the OFDM analog signal, and outputs a phase quantified value corresponding to the phase information of the each subcarrier, those skilled in the art to which the present application belongs may adopt any other known phase quantization analog-to-digital converter that can extract and quantize phase information of a modulated signal on each subcarrier in the OFDM analog signal, and output a phase quantified value corresponding to the phase information of the each subcarrier.

The OFDM demodulator 10 provided in the embodiments of the present application, by acquiring an OFDM analog signal, extracting and quantizing phase information of a modulated signal on each subcarrier in the OFDM analog signal, and outputting a phase quantified value corresponding to the phase information of the each subcarrier, and then performing determination according to the phase quantified value, to obtain modulation information corresponding to the each subcarrier, and converting the modulation information corresponding to the each subcarrier into serial demodulation output, achieves at least the technical effects that:

1) the OFDM demodulator 10 avoids the high requirements of the traditional voltage ADC on speed and precision, and greatly reduces the design difficulty of a receiver adopting the OFDM demodulator 10, as well as the cost and the power consumption;

2) compared with the traditional voltage ADC obtaining a phase through voltage calculation, the OFDM demodulator 10 with the phase analog-to-digital converter 11 directly obtains and quantizes a phase of a modulated signal on each subcarrier in the OFDM analog signal, having a higher efficiency, lower cost and reduced complexity;

3) the OFDM demodulator 10 with the phase analog-to-digital converter 11 obtains and quantize a phase of a modulated signal on each subcarrier in the OFDM analog signal, wherein fluctuations in the amplitude of an input signal in a certain range will not obviously influence the phase information, thereby reducing the requirement for gain control of the receiver using the OFDM demodulator, and facilitating reduction in the design cost and complexity of the receiver.

Figure 9:
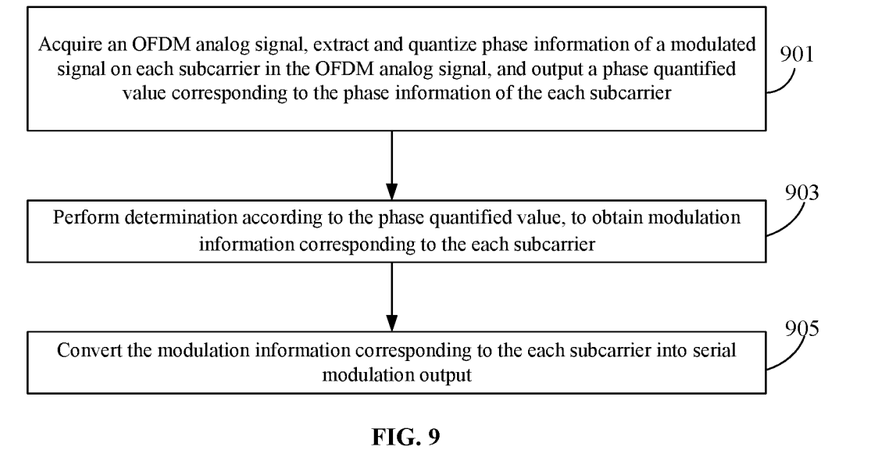
FIG. 9 is a schematic flowchart illustrating an OFDM demodulation method according to an embodiment of the present disclosure.

In another aspect, an embodiment of the present disclosure further provides an orthogonal frequency division multiplexing, OFDM, demodulation method, which, referring to FIG. 9, includes the following steps 901 to 903.

At step 901, an OFDM analog signal is acquired, phase information of a modulated signal on each subcarrier in the OFDM analog signal is extracted and quantized, and a phase quantified value corresponding to the phase information of the each subcarrier is output.

At step 903, determination is performed according to the phase quantified value, to obtain modulation information corresponding to the each subcarrier.

In an exemplary embodiment, the method may further include step 905: converting the modulation information corresponding to the each subcarrier into serial demodulation output.

Here, the OFDM demodulation method may be applied to the OFDM demodulator 10 provided in the embodiments of the present application, and the phase analog-to-digital converter 11 may be used to acquire an OFDM analog signal, extract and quantize phase information of a modulated signal on each subcarrier in the OFDM analog signal, and output a phase quantified value corresponding to the phase information of the each subcarrier; and the determiner 12 may be used to perform determination according to the phase quantified value, to obtain modulation information corresponding to the each subcarrier; and the parallel-to-serial converter 14 may be used to convert the modulation information corresponding to the each subcarrier into serial demodulation output.

In some embodiments, the step 901 includes: acquiring an OFDM analog signal, quantizing phase information in the OFDM analog signal, and decomposing the phase quantified value on each subcarrier in the OFDM analog signal according to multiple sets of quantified OFDM analog signals. Here, the phase analog-to-digital converter 11 may first quantize the phase information of the OFDM analog signal, and then perform decomposition to obtain a phase quantified value corresponding to each piece of phase information. The phase analog-to-digital converter 11 may include a phase quantizer and a phase decomposer 102.

In other embodiments, the step 901 includes: acquiring an OFDM analog signal, decomposing the OFDM analog signal into multiple parallel OFDM analog signals, and quantizing phase information in the decomposed multiple parallel OFDM analog signals to obtain the phase quantified value corresponding to the phase information of each sub carrier. Here, the phase analog-to-digital converter 11 may first decompose the OFDM analog signal to obtain the corresponding phase information, and then quantize the information to obtain a phase quantified value corresponding to each piece of phase information. The phase analog-to-digital converter 11 may include a signal decomposer 103 and a phase quantizer.

It should be noted that the OFDM demodulation method provided in the embodiment belongs to the same concept as the embodiments of the OFDM demodulator 10, and the specific implementation process thereof is described in detail in the embodiments of the OFDM demodulator 10 and thus is not repeated here.

Figure 10:
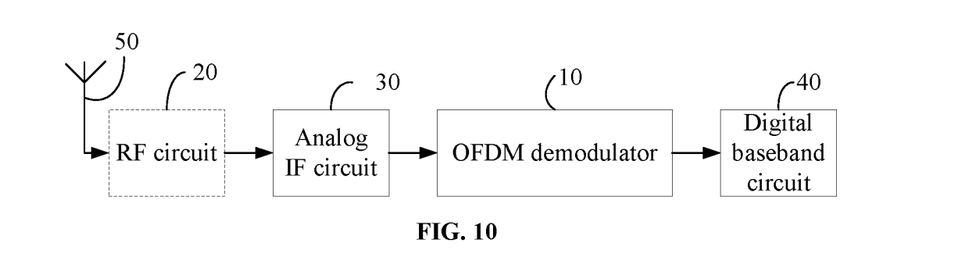
FIG. 10 is a schematic structural diagram of a receiver according to an embodiment of the present disclosure.

In another aspect, an embodiment of the present disclosure further provides a receiver which, referring to FIG. 10, includes an analog IF circuit 30, an OFDM demodulator, and a digital baseband circuit 40, the OFDM demodulator may be the OFDM demodulator 10 according to any of the embodiments of the present application. The analog IF circuit 30 is configured to amplify and filter an IF signal and output an IF OFDM analog signal to the OFDM demodulator 10, and the digital baseband circuit 40 is configured to receive serial demodulation output from the OFDM demodulator 10 and perform baseband operation and processing in a digital domain.

The receiver may further include an antenna 50 and an RF circuit 20. The antenna 50 is configured to receive an RF signal, and the RF circuit 20 is configured to amplify, filter and downconvert the RF signal received by the antenna 50 and output the downconverted IF OFDM analog signal to the analog IF circuit 30. The OFDM demodulator 10 outputs the demodulated serial digital bits to the digital baseband circuit 40, and performs baseband operation and processing in the digital domain, thereby achieving various functions such as channel equalization, frequency offset calibration, deinterleaving, and decoding. In an exemplary implementation, the OFDM demodulator 10 may further include a partial baseband operation function, and accordingly, may realize the baseband operation and processing in the digital domain together with the digital baseband circuit 40, thereby achieving various functions such as channel equalization, frequency offset calibration, deinterleaving, and decoding.

In the OFDM demodulator, the demodulation method and the receiver provided in the above embodiments, by acquiring an OFDM analog signal, extracting and quantizing phase information of a modulated signal on each subcarrier in the OFDM analog signal, and outputting a phase quantified value corresponding to the phase information of the each subcarrier; and then performing determination according to the phase quantified value, to obtain modulation information corresponding to the each subcarrier, it is achieved that the phase information on each subcarrier is directly obtained and quantified, and fluctuations in the amplitude of an input signal in a certain range will not obviously influence the phase information. In this manner, the requirement for gain control of a receiver using the demodulator is reduced, which facilitates reduction of the design cost and complexity of the receiver, avoids the need of obtaining the phase through voltage calculation by adopting a conventional voltage ADC, and reduces the design difficulty of the wireless receiver as well as the cost and the power consumption.

The foregoing are merely specific embodiments of the present disclosure, but the protection scope of the present disclosure is not limited thereto. Any change or alternative that can be easily thought by those skilled in the art within the technical scope disclosed by the present disclosure shall fall in the protection scope of the present disclosure. The scope of protection of the present disclosure shall be determined by the scope of the claims.

What is claimed is:

1. An orthogonal frequency division multiplexing, OFDM, demodulator, comprising: a phase analog-to-digital converter and a determiner, wherein
   the phase analog-to-digital converter is configured to acquire an OFDM analog signal, extract and quantize phase information of a modulated signal on each subcarrier in the OFDM analog signal, and output a phase quantified value corresponding to the phase information of the each subcarrier; and
   the determiner is configured to perform determination according to the phase quantified value, to obtain modulation information corresponding to the each subcarrier.

2. The OFDM demodulator of claim 1, further comprising: a parallel-to-serial converter; wherein
   the parallel-to-serial converter is configured to convert the modulation information corresponding to the each subcarrier into serial output.

3. The OFDM demodulator of claim 1, wherein the phase analog-to-digital converter comprises a phase quantizer and a phase decomposer connected to the phase quantizer; the phase quantizer is configured to quantize phase information in the OFDM analog signal, and the phase decomposer is configured to decompose the phase quantified value on each subcarrier in the OFDM analog signal according to multiple sets of quantified OFDM analog signals.

4. The OFDM demodulator of claim 1, wherein the phase analog-to-digital converter comprises a signal decomposer and a phase quantizer connected to the signal decomposer, wherein the signal decomposer is configured to decompose the OFDM analog signal into multiple parallel OFDM analog signals, and the phase quantizer is configured to quantize phase information in the decomposed multiple parallel OFDM analog signals to obtain the phase quantified value corresponding to the phase information of each subcarrier.

5. The OFDM demodulator of claim 3, wherein the phase quantizer comprises a serial phase quantizer configured to quantize phase information in the OFDM analog signal to obtain a function containing the phase quantified value corresponding to the phase information of each subcarrier.

6. The OFDM demodulator of claim 3, wherein the phase quantizer comprises a parallel phase quantizer comprising multiple phase analog-to-digital conversion branches, each of which is configured to quantize phase information in the OFDM analog signal to obtain a function containing the phase quantified value corresponding to the phase information of each sub carrier.

7. The OFDM demodulator of claim 3, wherein the phase quantizer comprises a combiner and a comparator, the combiner is configured to amplify or reduce in-phase input analog signals and quadrature input analog signals at different weights, respectively, and the comparator is configured to compare the amplified or reduced in-phase signals and quadrature signals to obtain quantified digital information.

8. The OFDM demodulator of claim 7, wherein the combiner comprises a sample-and-hold circuit, a quadrature switch circuit, and an integer combining circuit, the sample-and-hold circuit is configured to sample in-phase and quadrature branch analog input signals at a designated frequency and hold the signals in a next period for combination by a post circuit; the quadrature switch circuit is configured to switch between the in-phase signal and the quadrature signal; and the integer combining circuit is configured to achieve integer-times of amplification or reduction of an in-phase branch signal and a quadrature branch signal.

9. An OFDM demodulation method, comprising:
   acquiring an OFDM analog signal, extracting and quantizing phase information of a modulated signal on each subcarrier in the OFDM analog signal, and outputting a phase quantified value corresponding to the phase information of the each subcarrier; and
   performing determination according to the phase quantified value, to obtain modulation information corresponding to the each subcarrier.

10. The method of claim 9, further comprising:
    after obtaining the modulation information corresponding to the each subcarrier, converting the modulation information corresponding to the each subcarrier into serial demodulation output.

11. The method of claim 9, wherein the acquiring the OFDM analog signal, extracting and quantizing phase information of the modulated signal on each subcarrier in the OFDM analog signal, and outputting the phase quantified value corresponding to the phase information of the each subcarrier comprises:
    acquiring the OFDM analog signal, quantizing phase information in the OFDM analog signal, and decomposing the phase quantified value on each subcarrier in the OFDM analog signal according to multiple sets of quantified OFDM analog signals.

12. The method of claim 9, wherein the acquiring the OFDM analog signal, extracting and quantizing phase information of the modulated signal on each subcarrier in the OFDM analog signal, and outputting the phase quantified value corresponding to the phase information of the each subcarrier comprises:
    acquiring the OFDM analog signal, decomposing the OFDM analog signal into multiple parallel OFDM analog signals, and quantizing phase information in the decomposed multiple parallel OFDM analog signals to obtain the phase quantified value corresponding to the phase information of each subcarrier.

13. A receiver, comprising: an analog IF circuit, an OFDM demodulator as claimed in claim 1, and a digital baseband circuit, wherein: the analog IF circuit is configured to amplify and filter an IF signal and output an IF OFDM analog signal to the OFDM demodulator, and the digital baseband circuit is configured to receive serial demodulation output from the OFDM demodulator and perform baseband operation and processing in a digital domain.

14. The receiver of claim 13, further comprising an antenna and an RF circuit, wherein the antenna is configured to receive an RF signal, and the RF circuit is configured to amplify, filter and downconvert the RF signal received by the antenna and output the downconverted IF OFDM analog signal to the analog IF circuit.

15. The OFDM demodulator of claim 4, wherein the phase quantizer comprises a serial phase quantizer configured to quantize phase information in the OFDM analog signal to obtain a function containing the phase quantified value corresponding to the phase information of each subcarrier.

16. The OFDM demodulator of claim 4, wherein the phase quantizer comprises a parallel phase quantizer comprising multiple phase analog-to-digital conversion branches, each of which is configured to quantize phase information in the OFDM analog signal to obtain a function containing the phase quantified value corresponding to the phase information of each sub carrier.

17. The OFDM demodulator of claim 4, wherein the phase quantizer comprises a combiner and a comparator, the combiner is configured to amplify or reduce in-phase input analog signals and quadrature input analog signals at different weights, respectively, and the comparator is configured to compare the amplified or reduced in-phase signals and quadrature signals to obtain quantified digital information.

\* \* \* \* \*

UNITED STATES PATENT AND TRADEMARK OFFICE
CERTIFICATE OF CORRECTION

PATENT NO.        : 11,329,855 B2
APPLICATION NO.   : 17/288634
DATED             : May 10, 2022
INVENTOR(S)       : Jingjing Dong Page 1 of 1

It is certified that error appears in the above-identified patent and that said Letters Patent is hereby corrected as shown below:

In the Specification

Column 6, Line 64, the formula reading:
$$f[\varphi_1(k),\varphi_2(k),\varphi_3(k),\ldots\varphi_n(k)]|_{t=2T}=f[\varphi_1(T),\varphi_2(T),\varphi_3(T),\ldots\varphi_n(2T)] \quad (1\text{-}2)$$

Should read:
-- $f[\varphi_1(k), \varphi_2(k), \varphi_3(k), \ldots \varphi_n(k)]|_{t=2T}=f[\varphi_1(2T), \varphi_2(2T), \varphi_3(2T), \ldots \varphi_n(2T)]$  (1-2) --

Column 6, Line 66, the formula reading:
$$f[\varphi_1(k),\varphi_2(k),\varphi_3(k),\ldots\varphi_n(k)]|_{t=3T}=f[\varphi_1(T),\varphi_2(T),\varphi_3(T),\ldots\varphi_n(3T)] \quad (1\text{-}3)$$

Should read:
-- $f[\varphi_1(k), \varphi_2(k), \varphi_3(k), \ldots \varphi_n(k)]|_{t=3T}=f[\varphi_1(3T), \varphi_2(3T), \varphi_3(3T), \ldots \varphi_n(3T)]$  (1-3) --

Column 7, Line 1, the formula reading:
$$f[\varphi_1(k),\varphi_2(k),\varphi_3(k),\ldots\varphi_n(k)]|_{t=jT}=f[\varphi_1(T),\varphi_2(T),\varphi_3(T),\ldots\varphi_n(jT)] \quad (1\text{-}j)$$

Should read:
-- $f[\varphi_1(k), \varphi_2(k), \varphi_3(k), \ldots \varphi_n(k)]|_{t=jT}=f[\varphi_1(jT), \varphi_2(jT), \varphi_3(jT), \ldots \varphi_n(jT)]$  (1-j) --

Signed and Sealed this
Twenty-second Day of November, 2022

Katherine Kelly Vidal
*Director of the United States Patent and Trademark Office*